(12) United States Patent
Bauer et al.

(10) Patent No.: US 11,312,910 B2
(45) Date of Patent: Apr. 26, 2022

(54) DIORGANYLPHOSPHINIC ACID SALTS, METHOD FOR THE PRODUCTION THEREOF AND THE USE THEREOF

(71) Applicant: CLARIANT PLASTICS & COATINGS LTD, Muttenz (CH)

(72) Inventors: Harald Bauer, Kerpen (DE); Sebastian Hörold, Diedorf (DE); Martin Sicken, Cologne (DE)

(73) Assignee: Clariant International Ltd, Muttenz (CH)

( * ) Notice: Subject to any disclaimer, the term of this patent is extended or adjusted under 35 U.S.C. 154(b) by 279 days.

(21) Appl. No.: 16/317,679

(22) PCT Filed: Jul. 12, 2017

(86) PCT No.: PCT/EP2017/067609
§ 371 (c)(1),
(2) Date: Jan. 14, 2019

(87) PCT Pub. No.: WO2018/015251
PCT Pub. Date: Jan. 25, 2018

(65) Prior Publication Data
US 2019/0292464 A1 Sep. 26, 2019

(30) Foreign Application Priority Data

Jul. 20, 2016 (DE) .................... 10 2016 213 280.6

(51) Int. Cl.
| | | |
|---|---|---|
| C09K 21/12 | (2006.01) | |
| C07F 9/30 | (2006.01) | |
| C08K 5/5313 | (2006.01) | |
| C08L 77/00 | (2006.01) | |
| C08L 91/06 | (2006.01) | |
| C09D 5/18 | (2006.01) | |
| C09D 177/00 | (2006.01) | |
| C09D 191/06 | (2006.01) | |

(52) U.S. Cl.
CPC ............... *C09K 21/12* (2013.01); *C07F 9/30* (2013.01); *C07F 9/301* (2013.01); *C08K 5/5313* (2013.01); *C08L 77/00* (2013.01); *C08L 91/06* (2013.01); *C09D 5/185* (2013.01); *C09D 177/00* (2013.01); *C09D 191/06* (2013.01)

(58) Field of Classification Search
CPC . C09K 21/12; C07F 9/30; C07F 9/301; C08K 5/5313; C08L 77/00; C08L 91/06; C09D 5/185; C09D 177/00; C09D 191/06
USPC ....................................................... 523/179
See application file for complete search history.

(56) References Cited

U.S. PATENT DOCUMENTS

| | | |
|---|---|---|
| 4,208,321 A | 6/1980 | Sandler |
| 7,259,200 B2 | 8/2007 | Bauer et al. |
| 2005/0137418 A1 | 6/2005 | Bauer et al. |
| 2016/0368936 A1 | 12/2016 | Yao et al. |

FOREIGN PATENT DOCUMENTS

| | | | |
|---|---|---|---|
| CN | 1527844 A | | 9/2004 |
| CN | 102050835 A | | 5/2011 |
| CN | 102666693 A | | 9/2012 |
| CN | 103044868 A | * | 4/2013 |
| CN | 103073574 A | | 5/2013 |
| CN | 103073575 A | | 5/2013 |
| CN | 103073576 A | | 5/2013 |
| CN | 103073577 A | | 5/2013 |
| CN | 103087097 A | | 5/2013 |
| CN | 103087098 A | | 5/2013 |
| CN | 103102367 A | | 5/2013 |
| CN | 103172663 A | | 6/2013 |
| CN | 103172664 A | | 6/2013 |
| CN | 103172665 A | | 6/2013 |
| CN | 103172666 A | | 6/2013 |
| CN | 103172667 A | | 6/2013 |
| CN | 103172668 A | | 6/2013 |
| CN | 103172669 A | | 6/2013 |
| CN | 103172670 A | | 6/2013 |
| CN | 103788125 A | | 5/2014 |
| CN | 104530282 A | | 4/2015 |
| CN | 104650580 A | | 5/2015 |
| CN | 105061500 A | | 11/2015 |
| DE | 10347012 A1 | | 5/2005 |
| DE | 10359815 A | | 7/2005 |
| EP | 2025710 A1 | | 2/2009 |
| EP | 3091023 A1 | | 11/2016 |
| WO | 03/018644 A1 | | 3/2003 |
| WO | 2015/101136 A1 | | 7/2015 |
| WO | 2015/149265 A1 | | 10/2015 |

OTHER PUBLICATIONS

Machine translation of CN 103044868 (2013, 9 pages).*
Funkhouser et al., Rheological Comparison of Organogelators Based on Iron and Aluminum Complexes of Dodecylmethylphosphinic Acid and Methyl Dodecanephosphonic Acid, 2009, Langmuir, 25(15), 8672-8677 (Year: 2009).*
Ooi et al., "Lanthanide ion exchange properties of a coordination polymer consisting of di(2-ethylhexyl) phosphoric acid and trivalent metal ions (Ce3+, Fe3+, or Al3+)", Dalton Trans. (2014), vol. 43, pp. 4807-4812.
International Search Report dated Sep. 7, 2017, issued in corresponding International Patent Application No. PCT/EP2017/067609.
Office Action dated Sep. 23, 2021 (with informal translation), issued in corresponding Brazilian Patent Application No. BR112019000026-7.
First Chinese Office Action dated Jan. 11, 2019, issued in corresponding Chinese Patent Application No. 201611272752.9.

(Continued)

*Primary Examiner* — Kristin A Vajda
(74) *Attorney, Agent, or Firm* — Morgan, Lewis & Bockius LLP

(57) ABSTRACT

The invention relates to diorganylphosphinic salts containing 0.0001% to 99.9999% by weight of iron, to a process for preparation thereof and to the use thereof.

22 Claims, No Drawings

(56) References Cited

OTHER PUBLICATIONS

Second Chinese Office Action dated Aug. 13, 2019, issued in corresponding Chinese Patent Application No. 201611272752.9.
Office Action dated May 7, 2021, issued in corresponding German Patent Application No. 102016213280.6.
Office Action dated Feb. 12, 2020, issued in corresponding European Patent Application No. 17740721.0.
Office Action dated Sep. 14, 2021, issued in corresponding European Patent Application No. 17740721.0.
Office Action dated Nov. 23, 2020, issued in corresponding Indonesian Patent Application No. PID201811155.
Office Action dated Oct. 28, 2020, issued in corresponding Indian Patent Application No. 201817049141.
Hearing Notice dated May 22, 2021, issued in corresponding Indian Patent Application No. 201817049141.
English translation of Office Action dated Aug. 19, 2020, issued in corresponding Japanese Patent Application No. 2019-502059.
Search Report and Written Opinion dated Mar. 3, 2020, issued in corresponding Singapore Patent Application No. 11201811835Y.
English translation of Office Action with search report dated Dec. 25, 2020, issued in corresponding Taiwan Patent Application No. TW106118919.
Office Action dated Dec. 17, 2021, issued in corresponding Malaysian Patent Application No. PI2018002866.

* cited by examiner

DIORGANYLPHOSPHINIC ACID SALTS, METHOD FOR THE PRODUCTION THEREOF AND THE USE THEREOF

According to the prior art, dialkylphosphinic salts, also referred to as dialkylphosphinates, are used in flame retardant mixtures as Mg, Ca, Al, Sb, Sn, Ge, Ti, Fe, Zr, Zn, Ce, Bi, Sr, Mn, Li, Na and/or K salts.

The dialkylphosphinic salts themselves and other organic salts of phosphinic acid are also referred to collectively as diorganylphosphinic salts.

The flame retardant mixtures according to the prior art have limited thermal stability. They are effective within a restricted temperature range in which the starting materials can be compounded from polymer, flame retardants, glass fibers and further additives to give flame-retardant polymer molding compounds. This is referred to as a processing window bounded by a lower and an upper temperature limit.

The lower temperature limit arises in that only over and above a certain temperature is the viscosity of the polymer low enough for it to be transportable and miscible in the machines.

The upper temperature is manifested indirectly in breakdown of the raw materials and the later efflorescence of breakdown products when the flame-retardant polymer molding compounds and polymer moldings are stored under moist conditions. If the polymer breaks down, the mechanical strength values of the flame-retardant polymer moldings (modulus of elasticity, flexible strength, elongation at break) can also be reduced.

It is therefore an object of the present invention to provide a more thermally stable flame retardant mixture having an extensive processing window.

The object is achieved by diorganylphosphinic salts containing iron.

It has been found that, surprisingly, the diorganylphosphinic salts of the invention have a broader processing window in the compounding of flame-retardant polymer molding compounds and in the injection molding of flame-retardant polymer moldings and simultaneously exhibit good flame retardancy.

The invention therefore relates to diorganylphosphinic salts containing 0.0001% to 99.9999% by weight of iron.

The diorganylphosphinic salts preferably conform to the formula (I)

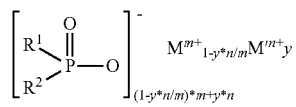

in which
R$^1$ and R$^2$ are the same or different and are C$_1$-C$_{18}$-alkyl in linear, branched or cyclic form, C$_6$-C$_{18}$-aryl, C$_7$-C$_{18}$-arylalkyl and/or C$_7$-C$_{18}$-alkylaryl, or together form at least one ring,
y is 0.00001 to 0.091,
m is 1 to 4 and
n is 2 to 3,
M is Mg, Ca, Al, Sb, Sn, Ge, Ti, Zr, Zn, Ce, Bi, Sr, Mn, Li, Na and/or K and
M' is Fe.

Preferably, R$^1$, R$^2$ in formula (I) are the same or different and are independently methyl, ethyl, n-propyl, isopropyl, n-butyl, tert-butyl, n-pentyl, 2-pentyl, 3-pentyl, 2-methylbutyl, 3-methylbutyl (isopentyl), 3-methylbut-2-yl, 2-methylbut-2-yl, 2,2-dimethylpropyl (neopentyl), hexyl, heptyl, octyl, nonyl, decyl, cyclopentyl, cyclopentylethyl, cyclohexyl, cyclohexylethyl, phenyl, phenylethyl, methylphenyl and/or methylphenylethyl.

The diorganylphosphinic salts preferably conform to the formula (II)

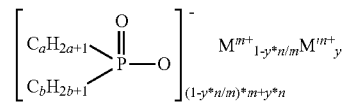

where
a and b are the same or different and are each independently 1 to 9 and the C$_a$H$_{2a+1}$ and C$_b$H$_{2b+1}$ groups may be linear or branched and
y is 0.00001 to 0.091,
m is 1 to 4 and
n is 2 to 3,
M is Mg, Ca, Al, Sb, Sn, Ge, Ti, Zr, Zn, Ce, Bi, Sr, Mn, Li, Na and/or K and
M' is Fe.

Preferably, the iron is in the form of iron(II) dialkylphosphinates and/or iron(III) dialkylphosphinates.

Preferably, M and M' are in the form of a homogeneous ionic compound with the (C$_a$H$_{2a+1}$)(C$_b$H$_{2b+1}$)PO$_2$ anions.

Preferably, the diorganylphosphinic salts further comprise telomer ions, where the telomer ions are those of the empirical formula (VI)

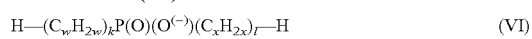

where, in formula (VI), independently of one another,
k is 1 to 9, l is 1 to 9,
w is 2 to 9, x is 2 to 9.

Preferably, in formula (VI), w and x are each 2 to 4 and k and l are each 1 to 4.

More preferably, in formula (VI), w and x are each 2 or 3 and k and l are each 1 to 3.

Preferably, the diorganylphosphinic salts as claimed in one or more of claims 1 to 9 comprise
a) 60 to 99.8999 P % dialkylphosphinic salts of the formula (II) and
b) 0.1 to 40 P % of telomer ions of the formula (VI),
where the sum total of a) and b) is 100 P %, with the proviso that the diorganylphosphinic salts of the formula (II) and the telomer ions of the formula (VI) are each different compounds.

Preferably, the diorganylphosphinic salts and telomer ions in the form of their metal salts form homogeneous ionic compounds, meaning that the telomer ions are incorporated into the diorganylphosphinic acids/telomer salts in ionic form.

Preferably, the ions M, M', (C$_a$H$_{2a+1}$)(C$_b$H$_{2b+1}$)PO$_2^-$, H—(C$_w$H$_{2w}$)$_k$PO$_2^-$(C$_x$H$_{2x}$)$_l$—H and the anions of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic acid (di(1-methylpropyl)phosphinic acid), propyl(hexyl)phosphinic acid, dihexylphosphinic acid, hexyl(nonyl)phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl) phosphinic acid, ethyl(cyclohexylethyl)phosphinic acid, butyl(cyclohexylethyl)phosphinic acid, ethyl(phenylethyl) phosphinic acid, butyl(phenylethyl)phosphinic acid, ethyl (4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl)phosphinic acid and/or butyl(4-methylphenyl)phosphinic acid together constitute a homogeneous ionic compound.

Preferably, the telomer ions are in the form of their metal salts, these being metal salts of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic acid (di-1-methylpropylphosphinic acid), propyl(hexyl)phosphinic acid, dihexylphosphinic acid, hexyl(nonyl) phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl) phosphinic acid, ethyl(4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl) phosphinic acid and/or butyl(4-methylphenyl)phosphinic acid, and the metal of the metal salt comes from the group of Mg, Ca, Al, Sb, Sn, Ge, Ti, Fe, Zr, Zn, Ce, Bi, Sr, Mn, Li, Na and/or K.

Preferably, the diorganylphosphinic salts of the invention have
a particle size of 0.1 to 1000 μm,
a bulk density of 80 to 800 g/L,
a tamped density/tapped density of 100 g/L to 1100 g/L,
an angle of repose of 5 to 45 degrees,
a BET surface area of 1 to 40 m$^2$/g,
L color values of 85 to 99.9,
a color values of −4 to +9 and
b color values of −2 to +6.

More preferably, the diorganylphosphinic salts of the invention have
a particle size of 0.5 to 800 μm,
a bulk density/tapped density of 80 g/L to 600 g/L,
a tamped density of 600 g/L to 800 g/L and
an angle of repose of 10 to 40 degrees.

The invention also relates to a process for producing diorganylphosphinic salts as claimed in one or more of claims 1 to 14, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding one to 9 further olefin molecules onto 0% to 20% of the dialkylphosphinate molecules from process stage 1, so as to form telomers,
d) in a process stage 4 conducting a crystallization of the intermediate from b) or c) with a metal salt and an iron salt.

The invention relates to a further process for producing diorganylphosphinic salts as claimed in one or more of claims 1 to 14, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding one to 9 further olefin molecules onto 0% to 20% of the dialkylphosphinate molecules from process stage 1, so as to form telomers,
d) in a process stage 4 conducting a crystallization with a metal salt and/or an iron salt and
e) in a process stage 5 conducting a coprecipitation of the intermediate from d) with a metal salt or an iron salt.

Preferably, the telomer salt forms coprecipitations with diorganylphosphinic salts that already incorporate ionic iron.

Another process for producing diorganylphosphinic salts as claimed in one or more of claims 1 to 14 comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 conducting a crystallization with a metal salt and/or an iron salt and
d) then in a process stage 4 physically mixing the telomers.

Preferably, the telomers have been physically mixed with diorganylphosphinic salts but already incorporate ionic iron.

The iron salts are preferably fluorides, chlorides, bromides, iodides, iodate, perchlorate, oxides, hydroxides, peroxides, superoxides, sulfates, hydrogensulfates, sulfate hydrates, sulfites, peroxosulfates, nitrides, phosphides, nitrates, nitrate hydrates, nitrites, phosphates, peroxophosphates, phosphites, hypophosphites, pyrophosphates, carbonates, hydrogencarbonates, hydroxide carbonates, carbonate hydrates, silicates, hexafluorosilicates, hexafluorosilicate hydrates, stannates, borates, polyborates, peroxoborates, thiocyanates, cyanates, cyanides, chromates, chromites, molybdates, permanganates, formates, acetates, acetate hydrates, trifluoroacetate hydrates, propionates, butyrates, valerates, caprylates, oleates, stearates, oxalates, tartrates, citrates, basic citrates, citrate hydrates, benzoates, salicylates, lactates, lactate hydrates, acrylates, maleates, salts of succinic acid, salts of glycine, phenoxides, para-phenolsulfonates, para-phenolsulfonate hydrates, acetylacetonate hydrates, tannates, dimethyldithiocarbamates, trifluoromethanesulfonate, alkylsulfonates and/or aralkylsulfonates.

Preference is given to using the diorganylphosphinic salts of the invention as an intermediate for further syntheses, as a binder, as a crosslinker or accelerator in the curing of epoxy resins, polyurethanes and unsaturated polyester resins, as polymer stabilizers, as crop protection compositions, as sequestrants, as a mineral oil additive, as an anticorrosive, in washing and cleaning composition applications and in electronics applications.

More particularly, the diorganylphosphinic salts of the invention are used as flame retardants, as flame retardants for clearcoats and intumescent coatings, as flame retardants for wood and other cellulosic products, as reactive and/or nonreactive flame retardant for polymers, for production of flame-retardant polymer molding compounds, for production of flame-retardant polymer moldings and/or for rendering polyester and pure and blended cellulose fabrics flame-retardant by impregnation.

Preference is given to the aforementioned use where the diorganylphosphinic salts as claimed in one or more of claims 1 to 14 are used together with synergists, where the synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates; or melamine condensation products such as melam, melem and/or melon; or oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, urea cyanurate, dicyandiamide and/or guanidine; or nitrogen-containing phosphates of the formula $(NH_4)_y H_{3-y} PO_4$ or $(NH_4PO_3)_z$ with y=1 to 3 and z=1 to 10 000; or aluminum phosphites, aluminum pyrophosphites, aluminum phosphonates, aluminum pyrophosphonates; or silicates, zeolites, silicas, ceramic powder, zinc compounds, e.g. zinc borate, zinc carbonate, zinc stannate, zinc hydroxystannate, zinc phosphate, zinc sulfide, zinc oxide, zinc hydroxide, tin oxide hydrate, basic zinc silicate, zinc molybdate, magnesium hydroxide, hydrotalcite, magnesium carbonate, calcium magnesium carbonate; or salts of ethylphosphonic acid, of propylphosphonic acid, of butylphosphonic acid, of n-butylphosphonic acid, of sec-butylphosphonic acid, of hexylphosphonic acid and/or of octylphosphonic acid.

Preference is given to such a use where further additives are used, these being antioxidants, UV stabilizers, gamma ray stabilizers, hydrolysis stabilizers, antistats, emulsifiers, nucleating agents, plasticizers, processing auxiliaries, impact modifiers, dyes, pigments and others.

More particularly, in the aforementioned uses,
0.0001% to 99.7999% by weight of diorganylphosphinic salts as claimed in one or more of claims 1 to 14,
0.1% to 40% by weight of synergists and
0.1% to 40% by weight of additives are used, where the sum of the components is 100% by weight.

The invention finally also relates to a flame-retardant thermoplastic or thermoset polymer molding compound or polymer molding, film, filament and/or fiber comprising 0.5% to 45% by weight of diorganylphosphinic salts as claimed in at least one of claims 1 to 14, 0.5% to 95% by weight of thermoplastic or thermoset polymer or mixtures thereof, 0% to 55% by weight of additives and 0% to 55% by weight of filler or reinforcing materials, where the sum of the components is 100% by weight.

Preferably, the polymer for the aforementioned use comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type, and/or thermoset polymers of the unsaturated polyester or epoxy resin type.

As already set out at the outset, the diorganylphosphinic salts of the invention are most frequently in the form of dialkylphosphinic salts.

According to the present invention, the iron may preferably be incorporated in ionic form in a dialkylphosphinic salt or a dialkylphosphinic acid telomer salt. Since aluminum dialkylphosphinate and iron(III) dialkylphosphinate are isostructural in terms of crystallography, iron(III) ions are incorporated into the aluminum dialkylphosphinate crystal lattice. This is shown by the uniformly changing c axis of the crystallographic unit cell. In that case, there are no physical mixtures.

This is particularly true of aluminum diethylphosphinate and the corresponding iron(III) diethylphosphinate.

TABLE 1

Crystallographic consequences of the incorporation of iron into aluminum tri(diethylphosphinate)

| Iron diethylphosphinate content [mol/(mol of iron diethylphosphinate + mol of aluminum diethylphosphinate)] | Length of the c axis of the crystallographic unit cell [angström] |
|---|---|
| 0.00 | 9.068 |
| 0.16 | 9.092 |
| 0.31 | 9.125 |

For the stability of the dialkylphosphinic salt or the dialkylphosphinic telomer salt against separation on agitation, the incorporation of the iron into the crystal lattice of the other metal, aluminum here, is advantageous.

The above statement also applies analogously to diorganylphosphinic salts containing groups other than alkyl groups or groups other than alkyl groups and alkyl groups.

The iron salts for the ionic incorporation are preferably soluble compounds.

The iron salts for the ionic incorporation are preferably iron(II) and/or iron(III) salts.

Preferably, the iron salts for the ionic incorporation and the coprecipitation are iron(II) and/or iron(III) salts with inorganic anions of the seventh main group (halides), for example fluorides, chlorides, bromides, iodides; with anions of the oxo acids of the seventh main group (hypohalites, halites, halogenates, e.g. iodate, perhalogenates, e.g. perchlorate); with anions of the sixth main group (chalcogenides), for example oxides, hydroxides, peroxides, superoxides; with anions of the oxo acids of the sixth main group (sulfates, hydrogensulfates, sulfate hydrates, sulfites, peroxosulfates); with anions of the fifth main group (pnicogenides), for example nitrides, phosphides; with anions of the oxo acids of the fifth main group (nitrate, nitrate hydrates, nitrites, phosphates, peroxophosphates, phosphites, hypophosphites, pyrophosphates); with anions of the oxo acids of the fourth main group (carbonates, hydrogencarbonates, hydroxide carbonates, carbonate hydrates, silicates, hexafluorosilicates, hexafluorosilicate hydrates, stannates); with anions of the oxo acids of the third main group (borates, polyborates, peroxoborates); with anions of the pseudohalides (thiocyanates, cyanates, cyanides); with anions of the oxo acids of the transition metals (chromates, chromites, molybdates, permanganate).

Preferably, the iron salts for the ionic incorporation and the coprecipitation are iron(II) and/or iron(III) salts with organic anions from the group of the mono-, di-, oligo- and polycarboxylic acids (salts of formic acid (formates)), of acetic acid (acetates, acetate hydrates), of trifluoroacetic acid (trifluoroacetate hydrates), propionates, butyrates, valerates, caprylates, oleates, stearates, of oxalic acid (oxalates), of tartaric acid (tartrates), citric acid (citrates, basic citrates, citrate hydrates), benzoic acid (benzoates), salicylates, lactic acid (lactate, lactate hydrates), acrylic acid, maleic acid, succinic acid, of amino acids (glycine), of acidic hydroxo functions (phenoxides, etc.), para-phenolsulfonates, para-phenolsulfonate hydrates, acetylacetonate hydrates, tannates, dimethyldithiocarbamates, trifluoromethanesulfonate, alkylsulfonates, aralkylsulfonates.

Preferred iron salts for the ionic incorporation are iron(II) and/or iron(III) borates, sulfates, sulfate hydrates, hydroxosulfate hydrates, mixed hydroxosulfate hydrates, oxysulfates, acetates, nitrates, fluoride, fluoride hydrates, chloride, chloride hydrates, oxychlorides, bromides, iodides, iodide hydrates and/or carboxylic acid derivatives.

Preferred iron salts for the physical mixture are iron(II) dialkylphosphinates.

Preferred iron(II) dialkylphosphinates are iron(II) bis(diethylphosphinate), iron(II) bis(dipropylphosphinate), iron (II) bis(butylethylphosphinate), iron(II) bis(n-butylethylphosphinate), iron(II) bis(sec-butylethylphosphinate), iron (II) bis(hexylethylphosphinate), iron(II) bis (dibutylphosphinate), iron(II) bis(hexylbutylphosphinate) and/or iron(II) bis(octylethylphosphinate).

Preferred iron salts for the physical mixture are iron(III) dialkylphosphinates.

Preferred iron(III) dialkylphosphinates are iron(III) tris (diethylphosphinate), iron(III) tris(dipropylphosphinate), iron(III) tris(butylethylphosphinate), iron(III) tris(n-butylethylphosphinate), iron(III) tris(sec-butylethylphosphinate), iron(III) tris(hexylethylphosphinate), iron(III) tris (dibutylphosphinate), iron(III) tris(hexylbutylphosphinate) and/or iron(III) tris(octylethylphosphinate).

Telomers are formed on addition of the olefin to the hypophosphite ion. Not just two molecules of olefin are added onto the dialkylphosphinate ion, but several. One or both alkyl chains are thus extended by one or more further olefin units.

Preferred telomers are those of the formula (V)

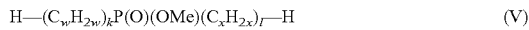

$$H\text{—}(C_wH_{2w})_kP(O)(OMe)(C_xH_{2x})_l\text{—}H \quad (V)$$

where, in formula (V), independently of one another,
k is 1 to 9, l is 1 to 9, w is 2 to 9 and x is 2 to 9 and Me is Mg, Ca, Al, Sb, Sn, Ge, Ti, Fe, Zr, Zn, Ce, Bi, Sr, Mn, Li, Na and/or K.

Preferably, the telomers are in the form of the Al, Ti, Fe and/or Zn salt.

In the case of use of ethylene as olefin in the preparation of the dialkylphosphinic salts of the invention, what are preferably formed are telomers of the ethylbutylphosphinic acid, dibutylphosphinic acid, ethylhexylphosphinic acid, butylhexylphosphinic acid, ethyloctylphosphinate type, etc., and/or salts thereof.

In the case of propene, the sequence is analogous.

Preferred olefins are ethene, propene, 1-butene, 2-butene, 1-pentene, 1-hexene and 1-octene.

The stereochemistry also allows the formation of branched alkyl chains, for example sec-butylethylphosphinate, 1-ethylbutyl(butyl)phosphinate, ethyl(1-methylpentyl) phosphinate, di-sec-butylphosphinate (di(1-methylpropyl) phosphinate) etc.

Telomers themselves are phosphorus compounds. The content thereof is reported in percent of all phosphorus-containing ingredients (P %) It is determined by means of $^{31}$P NMR.

The telomer anions of the formula (VI) specified in claim 7

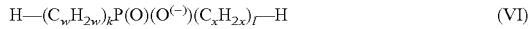

$$H\text{—}(C_wH_{2w})_kP(O)(O^{(-)})(C_xH_{2x})_l\text{—}H \quad (VI)$$

may preferably be incorporated into the crystal lattice of a dialkylphosphinic salt. In that case, dialkylphosphinic acid telomer salts are thus present.

For the stability of the dialkylphosphinic salts and the dialkylphosphinic acid telomer salts to separation in the course of agitation, small particle sizes are preferred.

Particular preference is given to median particle sizes $d_{50}$ of
dialkylphosphinic salts: 0.01-1000 μm,
dialkylphosphinic acid telomer salt: 0.01-1000 μm,
dialkylphosphinic acid/telomer salt coprecipitations: 0.01-1000 μm,
physical dialkylphosphinic acid/telomer salt mixtures: 0.01-1000 μm, Particular preference is given to median particle sizes $d_{50}$ of
dialkylphosphinic salts: 0.1-90 μm,
dialkylphosphinic acid telomer salt: 0.1-90 μm,
dialkylphosphinic acid/telomer salt coprecipitations: 0.1-90 μm,
physical dialkylphosphinic acid/telomer salt mixtures: 0.1-90 μm, The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol 143E (BASF), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates/alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof, such as are known, for example, as ABS, MBS, ASA or AES polymers.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers deriving from alpha, beta-unsaturated acids and derivatives thereof, such as polyacrylates and polymethacrylates, butyl acrylate-impact-modified polymethyl methacrylates, polyacrylamides and polyacrylonitriles and copolymers of the cited monomers with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers deriving from unsaturated alcohols and amines or from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals, such as polyoxymethylene, and those polyoxymethylenes which comprise comonomers, for example ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes deriving from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide)), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

It is also possible to use aromatic polyamides such as PA4T, PA6T, PA9T, PA10T, PA11T and/or MXD6, amorphous polyamides such as 6I/X and TPE-A "rigid" and "soft".

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates, polyester carbonates, polysulfones, polyether sulfones and polyether ketones.

The thermoset polymers are preferably formaldehyde polymers, epoxide polymers, melamine-phenolic resin polymers and/or polyurethanes.

The thermoset polymers are preferably epoxy resins.

The thermoset polymers are preferably epoxy resins which have been cured with resols, phenols, phenol derivatives and/or dicyandiamide, alcohols and amines.

The epoxy resins are preferably polyepoxide compounds.

The epoxy resins preferably originate from the group of the novolacs and the bisphenol A resins.

The thermoset polymer preferably comprises unsaturated polyester resins, dicyclopentadiene-modified unsaturated polyesters, polyphenylene ethers or butadiene polymers; block copolymers with a polybutadiene or polyisoprene block and a block of styrene or alpha-methylstyrene; block copolymers with a first polybutadiene block and a second polyethylene block or ethylene-propylene block, block copolymers with a first polyisoprene block and a second polyethylene or ethylene-propylene block.

The thermoset polymer is preferably one based on epoxidized vegetable oils (epoxidized soybean/linseed oil), acrylic acid derivatives (acrylic acid, crotonic acid, isocrotonic acid, methacrylic acid, cinnamic acid, maleic acid, fumaric acid, methylmethacrylic acid) and hydroxyalkyl acrylates and/or hydroxyalkyl alkacrylates (hydroxyethyl methacrylate, hydroxypropyl methacrylate, hydroxybutyl methacrylate, polyethylene glycol methacrylate).

The thermoset polymers preferably find use in electrical switch components, components in automobile construction, electrical engineering, electronics, printed circuit boards, prepregs, potting compounds for electronic components, in boat and rotor blade construction, in outdoor GFRP applications, domestic and sanitary applications, engineering materials and further products.

Preferably, the thermoset polymers comprise unsaturated polyester resins (UP resins) which derive from copolyesters of saturated and unsaturated polybasic starting materials, especially dicarboxylic acids or anhydrides thereof, with polyhydric alcohols, and vinyl compounds as crosslinking agents.

UP resins are cured by free-radical polymerization with initiators (e.g. peroxides) and accelerators.

Unsaturated polyesters may contain the ester group as a connecting element in the polymer chain.

Preferred unsaturated dicarboxylic acids and derivatives for preparation of the polyesters are maleic acid, maleic anhydride and fumaric acid, itaconic acid, citraconic acid, mesaconic acid. These may be blended with up to 200 mol %, based on the unsaturated acid components, of at least one aliphatic saturated or cycloaliphatic dicarboxylic acid.

Preferred saturated dicarboxylic acids are phthalic acid, isophthalic acid, terephthalic acid, dihydrophthalic acid, tetrahydrophthalic acid, hexahydrophthalic acid, endomethylenetetrahydrophthalic acid, adipic acid, succinic acid, sebacic acid, glutaric acid, methylglutaric acid, pimelic acid.

Preferred polyhydric, especially dihydric, optionally unsaturated alcohols are the customary alkanediols and oxaalkanediols having acyclic or cyclic groups.

Preferred unsaturated monomers copolymerizable with unsaturated polyesters preferably bear vinyl, vinylidene or allyl groups, for example preferably styrene, but also, for example, ring-alkylated or -alkenylated styrenes, where the alkyl groups may contain 1-4 carbon atoms, for example vinyltoluene, divinylbenzene, alpha-methylstyrene, tert-butylstyrene; vinyl esters of carboxylic acids having 2-6 carbon atoms, preferably vinyl acetate, vinyl propionate, vinyl benzoate; vinylpyridine, vinylnaphthalene, vinylcyclohexane, acrylic acid and methacrylic acid and/or esters thereof (preferably vinyl, allyl and methallyl esters) having 1-4 carbon atoms in the alcohol component, amides and nitriles thereof, maleic anhydride, maleic monoesters and diesters having 1-4 carbon atoms in the alcohol component, maleic mono- and -diamides or cyclic imides, such as butyl acrylate, methyl methacrylate, acrylonitrile, N-methylmaleimide or N-cyclohexylmaleimide; allyl compounds such as allylbenzene and allyl esters such as allyl acetate, diallyl phthalate, diallyl isophthalate, diallyl fumarate, allyl carbonates, diallyl phthalates, diallyl carbonates, triallyl phosphate and triallyl cyanurate.

A preferred vinyl compound for crosslinking is styrene.

Preferred unsaturated polyesters may bear the ester group in the side chain as well, for example polyacrylic esters and polymethacrylic esters.

Preferred hardener systems are peroxides and accelerators.

Preferred accelerators are metal coinitiators and aromatic amines and/or UV light and photosensitizers, for example benzoin ethers and azo catalysts such as azoisobutyronitrile, mercaptans such as lauryl mercaptan, bis(2-ethylhexyl) sulfide and bis(2-mercaptoethyl) sulfide.

In one process for preparing flame-retardant copolymers, at least one ethylenically unsaturated dicarboxylic anhydride derived from at least one $C_4$-$C_8$-dicarboxylic acid, at least one vinylaromatic compound and at least one polyol are copolymerized and then reacted with the flame retardant mixtures of the invention.

Usable with preference are dicyclopentadiene-modified unsaturated polyesters which are obtained by reaction of dicyclopentadiene, maleic anhydride, water, saturated alcohol and optionally a further polybasic acid. The polyester is crosslinked with a free-radically polymerizable monomer such as styrene to give the resin.

The polymers are preferably crosslinked polymers which derive from aldehydes and from phenols, urea or melamine, such as phenol-formaldehyde, urea-formaldehyde and melamine-formaldehyde resins.

The polymers preferably comprise crosslinkable acrylic resins which derive from substituted acrylic esters, for example from epoxy acrylates, urethane acrylates or polyester acrylates.

The polymers are preferably alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

Preferred thermosets are polymers from the class of the cyanate esters, cyanate ester/bismaleimide copolymer, bismaleimide/triazine epoxy blends and butadiene polymers.

Preferred butadiene polymers are block copolymers containing 70%-95% by weight of one or more monovinyl-substituted aromatic hydrocarbon compounds having 8-18 carbon atoms and 30%-5% by weight of one or more conjugated dienes having 4-12 carbon atoms and optionally crosslinkers.

Preferably, the flame retardant mixtures of the invention are also used in resin systems consisting of polybutadiene resins or polyisoprene resins or mixtures thereof with unsaturated butadiene- or isoprene-containing polymers which can take part in crosslinking.

Preferably, the polymers are crosslinked epoxy resins which derive from aliphatic, cycloaliphatic, heterocyclic or aromatic glycidyl compounds, for example from bisphenol A diglycidyl ethers, bisphenol F diglycidyl ethers, which are crosslinked by means of customary hardeners and/or accelerators.

Suitable glycidyl compounds are bisphenol A diglycidyl esters, bisphenol F diglycidyl esters, polyglycidyl esters of phenol formaldehyde resins and cresol-formaldehyde resins, polyglycidyl esters of phthalic acid, isophthalic acid and terephthalic acid, and of trimellitic acid, N-glycidyl compounds of aromatic amines and heterocyclic nitrogen bases, and di- and polyglycidyl compounds of polyhydric aliphatic alcohols.

Suitable hardeners are aliphatic, cycloaliphatic, aromatic and heterocyclic amines or polyamines, such as ethylenediamine, diethylenetriamine, triethylenetetramine, propane-1,3-diamine, hexamethylenediamine, aminoethylpiperazine, isophoronediamine, polyamidoamine, diaminodiphenylmethane, diaminodiphenyl ether, diaminodiphenyl sulfone, aniline-formaldehyde resins, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine (isophoronediamine), polyamidoamines, cyanoguanidine and dicyandiamide, and likewise polybasic acids or anhydrides thereof, for example phthalic anhydride, maleic anhydride, tetrahydrophthalic anhydride, methyltetrahydrophthalic anhydride, hexahydrophthalic anhydride and methylhexahydrophthalic anhydride, and also phenols, for example phenol-novolac resin, cresol-novolac resin, dicyclopentadiene-phenol adduct resin, phenol aralkyl resin, cresolaralkyl resin, naphtholaralkyl resin, biphenol-modified phenolaralkyl resin, phenoltrimethylolmethane resin, tetraphenylolethane resin, naphthol-novolac resin, naphthol-phenol cocondensate resin, naphthol-cresol cocondensate resin, biphenol-modified phenol resin and aminotriazine-modified phenol resin. All hardeners can be used alone or in combination with one another.

Suitable catalysts or accelerators for the crosslinking in the polymerization are tertiary amines, benzyldimethylamine, N-alkylpyridines, imidazole, 1-methylimidazole, 2-methylimidazole, 2-ethyl-4-methylimidazole, 2-ethyl-4-methylimidazole, 2-phenylimidazole, 2-heptadecylimidazole, metal salts of organic acids, Lewis acids and amine complex salts.

The polymers are preferably crosslinked polymers which derive from aldehydes on the one hand, and phenols, urea or melamine on the other hand, such as phenol-formaldehyde, urea-formaldehyde and melamine-formaldehyde resins. The polymers preferably comprise crosslinkable acrylic resins which derive from substituted acrylic esters, for example from epoxy acrylates, urethane acrylates or polyester acrylates.

Preferred polyester polyols are obtained by polycondensation of a polyalcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, glucose and/or sorbitol, with a dibasic acid such as oxalic acid, malonic acid, succinic acid, tartaric acid, adipic acid, sebacic acid, maleic acid, fumaric acid, phthalic acid and/or terephthalic acid. These polyester polyols can be used alone or in combination.

Suitable polyisocyanates are aromatic, alicyclic and/or aliphatic polyisocyanates having not fewer than two isocyanate groups and mixtures thereof. Preference is given to aromatic polyisocyanates such as tolyl diisocyanate, methylene diphenyl diisocyanate, naphthylene diisocyanate, xylylene diisocyanate, tris(4-isocyanatophenyl)methane and polymethylenepolyphenylene diisocyanates; alicyclic polyisocyanates such as methylenediphenyl diisocyanate, tolyl diisocyanate; aliphatic polyisocyanates and hexamethylene diisocyanate, isophorone diisocyanate, dimeryl diisocyanate, 1,1-methylenebis(4-isocyanatocyclohexane-4,4'-diisocyanatodicyclohexylmethane isomer mixture, 1,4-cyclohexyl diisocyanate, Desmodur® products (Bayer) and lysine diisocyanate and mixtures thereof.

Suitable polyisocyanates are modified products which are obtained by reaction of polyisocyanate with polyol, urea, carbodiimide and/or biuret.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers are preferably crosslinkable acrylic resins which derive from substituted acrylic esters, for example from epoxy acrylates, urethane acrylates or polyester acrylates.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylates, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

The molding produced is preferably of rectangular shape with a regular or irregular base, or of cubic shape, cuboidal shape, cushion shape or prism shape.

The flame retardant mixtures of the invention can also be used in elastomers, for instance nitrile rubber, nitrile rubber with carboxyl groups and carboxy-terminated butadiene-acrylonitrile, chloroprene rubber, butadiene rubber, acrylonitrile-butadiene rubber, styrene-butadiene rubber, butadiene rubber with acrylic resin and thermoplastic polyimide, urethane-modified copolyester polymer and other elastomers.

Preferred further additives in the flame retardant mixtures of the invention are from the group of the carbodiimides and/or (poly)isocyanates.

Preferred further additives come from the group of the sterically hindered phenols (e.g. Hostanox® OSP 1), sterically hindered amines and light stabilizers (e.g. Chimasorb® 944, Hostavin® products), phosphonites and antioxidants (e.g. Sandostab® P-EPQ from Clariant) and separating agents (Licomont® products from Clariant).

Preferred fillers in the flame retardant mixtures of the invention are oxygen compounds of silicon, magnesium compounds, e.g. metal carbonates of metals of the second main group of the Periodic Table, magnesium oxide, magnesium hydroxide, hydrotalcites, dihydrotalcite, magnesium carbonates or magnesium calcium carbonates, calcium compounds, e.g. calcium hydroxide, calcium oxide, hydrocalumite, aluminum compounds, e.g. aluminum oxide, aluminum hydroxide, boehmite, gibbsite or aluminum phosphate, red phosphorus, zinc compounds and/or aluminum compounds.

Preferred further fillers are glass beads.

Glass fibers are preferably used as reinforcing materials.

Compounding units usable in accordance with the invention are multizone screw extruders having three-zone screws and/or short compression screws.

Compounding units usable in accordance with the invention are also co-kneaders, for example from Coperion Buss Compounding Systems, Pratteln, Switzerland, e.g. MDK/E46-11D, and/or laboratory kneaders (MDK 46 from Buss, Switzerland with L=11D).

Compounding units usable in accordance with the invention are twin-screw extruders, for example from Coperion Werner & Pfleiderer GmbH & Co. KG, Stuttgart (ZSK 25, ZSK 30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Compounding units usable in accordance with the invention are ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Compounding units usable in accordance with the invention are compounders with a contrarotatory twin screw, for example Compex 37 and 70 models from Krauss-Maffei Berstorff.

Inventive effective screw lengths (L) in the case of single-shaft extruders or single-screw extruders are 20 to 40 D, in the case of twin-shaft extruders 8 to 48 D, and in the case of multizone screw extruders, for example, 25 D with intake zone (L=10 D), transition zone (L=6 D) and ejection zone (L=9 D).

The invention additionally relates to the use of the inventive flame retardant mixture as claimed in one or more of claims 1 to 19 in or for plug connectors, current-bearing components in power distributors (residual current protection), circuit boards, potting compounds, plug connectors, circuit breakers, lamp housings, LED housings, capacitor housings, coil elements and ventilators, grounding contacts, plugs, in/on printed circuit boards, housings for plugs, cables, flexible circuit boards, charging cables for mobile phones, motor covers, textile coatings and other products.

These include moldings in the form of components for the electrics/electronics sector, especially for parts of printed circuit boards, housings, films, wires, switches, distributors, relays, resistors, capacitors, coils, lamps, diodes, LEDs, transistors, connectors, regulators, memory elements and sensors, in the form of large-area components, especially of housing components for switchgear cabinets and in the form of components of complicated configuration with demanding geometry.

Preferably, in the case of such moldings, the wall thickness is less than 0.5 mm, but may also be more than 1.5 mm (up to 10 mm). Particularly suitable thicknesses are less than 1.5 mm, more preferably less than 1 mm and especially preferably less than 0.5 mm.

The flame retardant mixture of the invention is preferably used with glass fibers having an arithmetic mean length of 100 to 220 µm for production of flame-retardant polyamide molding compounds and/or moldings, wherein the production process for the polyamide molding compound or the molding is adjusted such that the glass fibers in the resulting polyamide molding compound or the molding have an arithmetic mean length in the range from 100 to 220 µm, and wherein the polyamide molding compound or the molding preferably has an IEC 60695-11-10 (UL94) classification of V-0.

Production, processing and testing of flame-retardant polymer molding compounds and polymer moldings The dialkylphosphinic salts (including the dialkylphosphinic acid telomer salts) are mixed with the polymer pellets and any additives and incorporated into the polymer via the side intake of a twin-screw extruder (Leistritz ZSE 27/44D) at temperatures of 230 to 260° C. (glass fiber-reinforced PBT), at 260 to 310° C. (PA 6,6) and at 250-275° C. (PA 6). The glass fibers were added via a second side intake. The homogenized polymer strand was drawn off, cooled in a water bath and then pelletized to give flame-retardant polymer molding compounds.

After sufficient drying, the molding compositions were processed on an injection molding machine (model: Arburg 320 C Allrounder) at melt temperatures of 240 to 300° C. to give flame-retardant polymer moldings. They can be used as test specimens and tested for flame retardancy and classified by the UL 94 test (Underwriter Laboratories).

Determination of the processing window of the PA-GF30 compound in the isothermal DSC test In accordance with the general method above, flame-retardant polymer molding compounds and flame-retardant polymer moldings are produced. The composition is 49.7% by weight of polyamide (Ultramid® A 27 E 01 from BASF SE), 30% by weight of glass fibers (PPG HP 3610 EC10 glass fibers from PPG), 12.6% by weight of dialkylphosphinic salts of the invention (including the dialkylphosphinic acid telomer salts) corresponding to the examples, 6.6% by weight of melamine polyphosphate (Melapur® 200/70 from BASF), 0.8% by weight of zinc borate (Firebrake® 500 from Rio Tinto Minerals), 0.3% by weight of wax (Licowax® E Gran from Clariant).

Since the lower limit of the processing window is unaffected, the measure used for determining the processing window is the breakdown of the flame-retardant polymer molding compound at the upper limit. This is done using the weight loss at a defined temperature.

DSC (differential thermal analysis) under air after a delay time of 60 min is used to determine the weight loss at 330° C. in % by weight.

The free flow of the flame retardant mixture of the invention is determined according to Pfrengle (DIN ISO 4324 Surface active agents; powders and granules; measurement of the angle of repose, December 1983, Beuth Verlag Berlin).

The aforementioned free flow is determined by the determination of the height of the cone of a powder or granular material or the ratio of cone radius to cone height. The cone is produced by pouring a specific amount of the substance to be examined through a specific funnel in a defined apparatus. The defined cone radius is produced by pouring the cone until the product flows over a circular plate raised from the base. The radius of the plate is fixed. The funnel has an internal diameter of 10 mm. The plate has a radius of 50 mm. 5 determinations are conducted and averaged. The height is measured in millimeters with a scale proceeding from the plate up to the vertex of the cone. The ratio of cone radius (50 mm) to cone height is calculated from the mean value.

Using a flame retardant mixture according to the prior art, cone of repose heights of 29.9 to 49.9 mm, corresponding to a span of 20 mm, were determined, and ratios of radius to height (=cot alpha) of 1.67 to 1.00, corresponding to a span of 0.67.

The angle of repose is the angle between the straight line formed by the base of the cone and the straight line formed by the cone mound, i.e. is determined by the cone tip and cone radius.

Test specimens of each mixture were used to determine the UL 94 fire class (Underwriter Laboratories) on specimens of thickness 1.5 mm.

The UL 94 fire classifications are as follows:

V-0 afterflame time never longer than 10 sec, total of afterflame times for 10 flame applications not more than 50 sec, no flaming drops, no complete consumption of the specimen, afterglow time for specimens never longer than 30 sec after end of flame application V-1 afterflame time never longer than 30 sec after end of flame application, total of afterflame times for 10 flame applications not more than 250 sec, afterglow time for specimens never longer than 60 sec after end of flame application, other criteria as for V-0

V-2 cotton indicator ignited by flaming drops, other criteria as for V-1

Not classifiable (ncl): does not comply with fire classification V-2.

EXAMPLE 1

According to DE-A-10359815, a sodium diethylphosphinate solution with phosphorus content 7.71% by weight is prepared. 2652 g of this solution are metered at 80° C. into deionized water simultaneously with 1364 g of aluminum sulfate solution to which 70 mg of 22% by weight iron(III) sulfate solution have been added. The crystal suspension is hot-filtered through a suction filter and washed with 15 times the amount of hot water. The moist filtered product is dried at 120° C. under a nitrogen atmosphere in a drying cabinet for about 18 h and contains 0.2% by weight residual moisture (RM) and 18 ppm of iron.

The iron is incorporated into the crystal lattice of the diethylphosphinic salt.

The thermal stability and the processing window (see table for both) are superior to pure aluminum diethylphosphinate (comparative example 7). The thermal stability is determined using the dialkylphosphinic salt of the invention, and the processing window using the flame-retardant polymeric molding compound.

EXAMPLE 2

According to DE-A-10359815, a sodium diethylphosphinate solution comprising sec-butyl ethylphosphinate (1-methylpropyl ethylphosphinate) and with phosphorus content 7.71% by weight is prepared. According to example 1, it is processed using 0.2 g of a 22% by weight iron(III) sulfate solution to give a product containing 0.1% by weight RM, 0.9 P % sec-butyl ethylphosphinate and 52 ppm of iron.

The iron is incorporated into the crystal lattice of the diethylphosphinic acid telomer salt.

The thermal stability and the processing window (see table for both) are superior to pure aluminum diethylphosphinate (comparative example 7). The thermal stability is determined using the diethylphosphinic acid telomer salt of the invention, and the processing window using the flame-retardant polymeric molding compound.

EXAMPLE 3

According to DE-A-10359815, a sodium diethylphosphinate solution comprising n-butyl ethylphosphinate and with phosphorus content 7.71% by weight is prepared. According to example 1, it is processed using 0.2 g of 22% by weight iron(III) sulfate solution to give a product containing 0.1% by weight RM, 1.8 P % n-butyl ethylphosphinate and 52 ppm of iron.

The iron is incorporated into the crystal lattice of the diethylphosphinic acid telomer salt.

The thermal stability and the processing window (see table for both) are superior to pure aluminum diethylphosphinate (comparative example 7). The thermal stability is determined using the diethylphosphinic acid telomer salt of the invention, and the processing window using the flame-retardant polymeric molding compound.

EXAMPLE 4

According to DE-A-10359815, a sodium diethylphosphinate solution comprising n-butyl ethylphosphinate and with phosphorus content 7.71% by weight is prepared. According to example 1, it is processed using 0.2 g of 22% by weight iron(III) sulfate solution to give a product containing 0.2% by weight RM, 0.9 P % n-butyl ethylphosphinate and 52 ppm of iron.

The iron is incorporated into the crystal lattice of the diethylphosphinic acid telomer salt.

The thermal stability and the processing window (see table for both) are superior to pure aluminum diethylphosphinate (comparative example 7). The thermal stability is determined using the diethylphosphinic acid telomer salt of the invention, and the processing window using the flame-retardant polymeric molding compound.

EXAMPLE 5

According to DE-A-10359815, a sodium diethylphosphinate solution comprising n-butyl ethylphosphinate and with phosphorus content 7.71% by weight is prepared. According to example 1, it is processed using 3.9 g of 22% by weight iron(III) sulfate solution to give a product containing 0.2% by weight RM, 4 P % n-butyl ethylphosphinate and 1019 ppm of iron.

The iron is incorporated into the crystal lattice of the diethylphosphinic acid telomer salt.

The thermal stability and the processing window (see table for both) are superior to pure aluminum diethylphosphinate (comparative example 7). The thermal stability is determined using the diethylphosphinic acid telomer salt of the invention, and the processing window using the flame-retardant polymeric molding compound.

EXAMPLE 6

According to DE-A-10359815, a sodium diethylphosphinate solution comprising sec-butyl ethylphosphinate and n-butyl ethylphosphinate and with phosphorus content 7.71% by weight is prepared. According to example 1, it is processed using 52 g of 22% by weight iron(III) sulfate solution to give a product containing 0.3% by weight RM, 0.9 P % sec-butyl ethylphosphinate, 10 P % n-butyl ethylphosphinate and 13 783 ppm of iron.

The iron is incorporated into the crystal lattice of the diethylphosphinic acid telomer salt.

The thermal stability and the processing window (see table for both) are superior to pure aluminum diethylphosphinate (comparative example 7). The thermal stability is determined using the diethylphosphinic acid telomer salt of the invention, and the processing window using the flame-retardant polymeric molding compound.

EXAMPLE 7 (COMPARATIVE)

Aluminum diethylphosphinate with no telomer and/or iron content shows the thermal stability and processing window listed in table 2.

TABLE 2

Amounts used in the crystallizations [g]

| Example | Amounts used | | | | | | Product analysis | |
|---|---|---|---|---|---|---|---|---|
| | H$_2$O [g] | Diethyl-phosphinic acid, sodium salt, aqueous solution 7.71% P [g] | Al sulfate solution 4.35% Al [g] | Fe sulfate solution 22% Fe [g] | Diethyl-phosphinic acid, aluminum salt [g] | Yield [g] | Residual moisture content [%] | Fe content [ppm Fe] |
| 1 | 3800 | 2652 | 1364 | 0.07 | — | 835 | 0.2 | 18 |
| 2 | 3800 | 2652 | 1364 | 0.20 | — | 845 | 0.1 | 52 |
| 3 | 3800 | 2652 | 1364 | 0.20 | — | 840 | 0.1 | 52 |
| 4 | 3800 | 2652 | 1364 | 0.20 | — | 840 | 0.2 | 52 |
| 5 | 3800 | 2652 | 1355 | 3.90 | — | 842 | 0.2 | 1019 |
| 6 | 3800 | 2652 | 1238 | 52.0 | — | 830 | 0.3 | 13 783 |
| 7 comp. | — | — | — | — | 1000 | — | 0.2 | 0 |

| Example | Product analysis | | | | | |
|---|---|---|---|---|---|---|
| | sec-Butyl ethyl-phosphinate [P %] | n-Butyl ethyl-phosphinate [P %] | Therm. stability [° C.] | Processing window [%] | BET surface area [m$^2$/g] | Tapped/tamped density [g/L] |
| 1 | — | — | 334 | 5.0 | 1.8 | 560 |
| 2 | 0.1 | — | 348 | 4.0 | 2.4 | 570 |
| 3 | — | 1.8 | 374 | 3.8 | 1.8 | 560 |
| 4 | — | 0.9 | 349 | 4.0 | 3.6 | 610 |
| 5 | — | 4 | 366 | 4.8 | 2.0 | 560 |
| 6 | 0.9 | 10 | 360 | 4.5 | 3.6 | 580 |
| 7 comp. | — | — | 325 | 8 | 1.8 | 610 |

The inventive dialkylphosphinic salts and dialkylphosphinic telomer salts having a defined iron content have a visibly greater (wider) processing window than a diethylphosphinic salt containing no iron.

They all show good flame retardancy in PA6.

In the above table, thermal stability was measured with the aid of thermogravimetry (TGA). The temperature reported is that at which there is 2% by weight of weight loss.

The processing window of the polymer molding compound was likewise determined by TGA. The weight loss is measured in percent by weight at 330° C. after 1 h. TGA is conducted under an air atmosphere.

In the case of the polymer molding compound, the maximum scope of the flame retardant composition of the invention is polyamide, MPP (melamine polyphosphate), glass fibers, zinc borate and wax.

The invention claimed is:

1. A diorganylphosphinic salt conforming to formula (II)

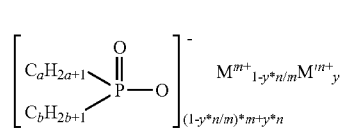

(II)

wherein the $C_aH_{2a+1}$ and $C_bH_{2b+1}$ groups are the same or different and are each methyl, ethyl, n-propyl, isopropyl, n-butyl, or tert-butyl, y is 0.00001 to 0.091, m is 1 to 4, n is 2 to 3, M is Mg, Ca, Al, Sb, Sn, Ge, Ti, Zr, Zn, Ce, Bi, Sr, Mn, Li, Na and/or K, and M' is Fe.

2. The diorganylphosphinic salt as claimed in claim 1, wherein the iron is in the form of iron(II) dialkylphosphinates and/or iron(III) dialkylphosphinates.

3. The diorganylphosphinic salt as claimed in claim 1, wherein M and M' are in the form of a homogeneous ionic compound with the $(C_aH_{2a+1})(C_bH_{2b+1})PO_2$ anions.

4. The diorganylphosphinic salt as claimed in claim 1, which further comprises telomer ions, where the telomer ions are those of the empirical formula (VI)

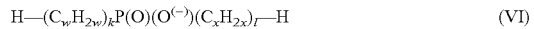

(VI)

where, in formula (VI), independently of one another, k is 1 to 9, l is 1 to 9, w is 2 to 9, and x is 2 to 9.

5. The diorganylphosphinic salt as claimed in claim 4, wherein, in formula (VI),
w and x are each 2 to 4 and k and l are each 1 to 4.

6. The diorganylphosphinic salt as claimed in claim 4, wherein, in formula (VI),
w and x are each 2 or 3 and k and l are each 1 to 3.

7. The diorganylphosphinic salt as claimed in claim 4, which comprises
a) 60 to 99.8999 P % dialkylphosphinic salts of the formula (II), and
b) 0.1 to 40 P % of telomer ions of the formula (VI),
where the sum total of a) and b) is 100 P %, with the proviso that the diorganylphosphinic salts of the formula (II) and the telomer ions of the formula (VI) are each different compounds.

8. The diorganylphosphinic salt as claimed in claim 4, wherein the ions M, M', $(C_aH_{2a+1})(C_bH_{2b+1})PO_2^-$, $H-(C_wH_{2w})_kPO_2^-(C_xH_{2x})_l-H$ and anions of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic acid (di(1-methylpropyl)phosphinic acid), propyl(hexyl)phosphinic acid, dihexylphosphinic acid, hexyl(nonyl)phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl)phosphinic acid, ethyl(4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl)phosphinic acid and/or butyl(4-methylphenyl)phosphinic acid together constitute a homogeneous ionic compound.

9. The diorganylphosphinic salt as claimed in claim 4, wherein the telomer ions are in the form of their metal salts, these being metal salts of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic acid (di-1-methylpropylphosphinic acid), propyl(hexyl)phosphinic acid, dihexylphosphinic acid, hexyl(nonyl)phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl)phosphinic acid, ethyl(4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl)phosphinic acid and/or butyl(4-methylphenyl)phosphinic acid, and the metal of the metal salt comes from the group of Mg, Ca, Al, Sb, Sn, Ge, Ti, Fe, Zr, Zn, Ce, Bi, Sr, Mn, Li, Na and/or K.

10. The diorganylphosphinic salt as claimed in claim 1, which has
a particle size of 0.1 to 1000 μm,
a bulk density of 80 to 800 g/L,
a tamped density of 100 g/L to 1100 g/L,
an angle of repose of 5 to 45 degrees,
a BET surface area of 1 to 40 m$^2$/g,
L color values of 85 to 99.9,
a color values of −4 to +9, and
b color values of −2 to +6.

11. The diorganylphosphinic salt as claimed in claim 1, which has
a particle size of 0.5 to 800 μm,
a bulk density of 80 to 600 g/L,
a tamped density of 600 g/L to 800 g/L, and
an angle of repose of 10 to 40 degrees.

12. A process for producing diorganylphosphinic salts as claimed in claim 1, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding one to 9 further olefin molecules onto 0% to 20% of the dialkylphosphinate molecules from process stage 1, so as to form telomers, and
d) in a process stage 4 conducting a crystallization of the intermediate from b) or c) with a metal salt and an iron salt.

13. A process for producing diorganylphosphinic salts as claimed in claim 1, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding one to 9 further olefin molecules onto 0% to 20% of the dialkylphosphinate molecules from process stage 1, so as to form telomers,
d) in a process stage 4 conducting a crystallization with a metal salt and/or an iron salt, and
e) in a process stage 5 conducting a coprecipitation of the intermediate from d) with a metal salt or an iron salt.

14. A process for producing diorganylphosphinic salts as claimed in claim 1, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 conducting a crystallization with a metal salt and/or an iron salt, and
d) then in a process stage 4 physically mixing the telomers.

15. The process as claimed in claim 12, wherein the iron salts are fluorides, chlorides, bromides, iodides, iodate, perchlorate, oxides, hydroxides, peroxides, superoxides, sulfates, hydrogensulfates, sulfate hydrates, sulfites, peroxosulfates, nitrides, phosphides, nitrates, nitrate hydrates, nitrites, phosphates, peroxophosphates, phosphites, hypophosphites, pyrophosphates, carbonates, hydrogencarbonates, hydroxide carbonates, carbonate hydrates, silicates, hexafluorosilicates, hexafluorosilicate hydrates, stannates, borates, polyborates, peroxoborates, thiocyanates, cyanates, cyanides, chromates, chromites, molybdates, permanganates, formates, acetates, acetate hydrates, trifluoroacetate hydrates, propionates, butyrates, valerates, caprylates, oleates, stearates, oxalates, tartrates, citrates, basic citrates, citrate hydrates, benzoates, salicylates, lactates, lactate hydrates, acrylates, maleates, salts of succinic acid, salts of glycine, phenoxides, para-phenolsulfonates, para-phenolsulfonate hydrates, acetylacetonate hydrates, tannates, dimethyldithiocarbamates, trifluoromethanesulfonate, alkylsulfonates and/or aralkylsulfonates.

16. The process as claimed in claim 12, wherein the metal of the metal salt comes from the group of Al, Te, Fe and/or Zn.

17. A flame retardant comprising a diorganylphosphinic salt as claimed in claim 1.

18. The diorganylphosphinic salts as claimed in claim 1 together with synergists, where the synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates; or melamine condensation products such as melam, melem and/or melon; or oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, urea cyanurate, dicyandiamide and/or guanidine; or nitrogen-containing phosphates of the formula $(NH_4)_y H_{3-y} PO_4$ or $(NH_4 PO_3)_z$ with y=1 to 3 and z=1 to 10 000; or aluminum phosphites, aluminum pyrophosphites, aluminum phosphonates, aluminum pyrophosphonates; or silicates, zeolites, silicas, ceramic powder, zinc compounds, zinc borate, zinc carbonate, zinc stannate, zinc hydroxystannate, zinc phosphate, zinc sulfide, zinc oxide, zinc hydroxide, tin oxide hydrate, basic zinc silicate, zinc molybdate, magnesium hydroxide, hydrotalcite, magnesium carbonate, calcium magnesium carbonate; or salts of ethylphosphonic acid, of propylphosphonic acid, of butylphosphonic acid, of n-butylphosphonic acid, of sec-butylphosphonic acid, of hexylphosphonic acid and/or of octylphosphonic acid.

19. The flame retardant as claimed in claim 17, further comprising antioxidants, UV stabilizers, gamma ray stabilizers, hydrolysis stabilizers, antistats, emulsifiers, nucleating agents, plasticizers, processing auxiliaries, impact modifiers, dyes, and/or pigments.

20. A flame retardant comprising 0.0001% to 99.7999% by weight of diorganylphosphinic salts as claimed in claim 1, 0.1% to 40% by weight of synergists and 0.1% to 40% by weight of additives, where the sum of the components is 100% by weight.

21. A flame-retardant thermoplastic or thermoset polymer molding composition or polymer molding, film, filament and/or fiber comprising 0.5% to 45% by weight of diorganylphosphinic salts as claimed in claim 1, 0.5% to 95% by weight of thermoplastic or thermoset polymer or mixtures thereof, 0% to 55% by weight of additives and 0% to 55% by weight of filler or reinforcing materials, where the sum of the components is 100% by weight.

22. The thermoplastic or thermoset polymer molding composition, polymer molding, film, filament and/or fiber as claimed in claim 21, wherein the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer, and/or thermoset polymers of unsaturated polyester or epoxy resins.

\* \* \* \* \*